(12) United States Patent
Oguma et al.

(10) Patent No.: US 11,502,376 B2
(45) Date of Patent: Nov. 15, 2022

(54) BATTERY MODULE AND BATTERY PACK (71) Applicant: TOYOTA JIDOSHA KABUSHIKI KAISHA, Toyota (JP)

(72) Inventors: Yasumasa Oguma, Shizuoka-ken (JP); Yoshihiro Iwano, Toyota (JP); Kenichiro Nakashima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/181,440

(22) Filed: Nov. 6, 2018

(65) Prior Publication Data
US 2019/0148702 A1 May 16, 2019

(30) Foreign Application Priority Data

Nov. 13, 2017 (JP) .............................. JP2017-218357

(51) Int. Cl.
| | |
|---|---|
| *H01M 50/502* | (2021.01) |
| *H01M 50/20* | (2021.01) |
| *H01M 50/543* | (2021.01) |
| *H01M 10/04* | (2006.01) |

(52) U.S. Cl.
CPC ..... *H01M 50/502* (2021.01); *H01M 10/0481* (2013.01); *H01M 50/20* (2021.01); *H01M 50/543* (2021.01); *H01M 2220/20* (2013.01)

(58) Field of Classification Search
CPC .... H01M 2/206; H01M 2/1077; H01M 2/305; H01M 10/0481; H01M 2/06; H01M 2220/20; H01M 2/1011; H01M 2/202
See application file for complete search history.

(56) References Cited

U.S. PATENT DOCUMENTS

| | | | |
|---|---|---|---|
| 2003/0148178 A1* | 8/2003 | Kaneta | H01M 50/548 |
| | | | 429/162 |
| 2003/0151388 A1 | 8/2003 | Shimamura et al. | |
| 2004/0253512 A1 | 12/2004 | Watanabe et al. | |
| 2012/0156537 A1 | 6/2012 | Meintschel et al. | |

(Continued)

FOREIGN PATENT DOCUMENTS

| | | |
|---|---|---|
| DE | 102009005124 A1 | 7/2010 |
| DE | 102010012999 A1 | 9/2011 |

(Continued)

OTHER PUBLICATIONS

Schroter, DE102010012999A1—Machine Translation (Year: 2010).*
Partial Translation of Communication dated Mar. 2, 2021 by the Japanese Patent Office in application No. 2017-218357.

*Primary Examiner* — Brian R Ohara
*Assistant Examiner* — Patrick Marshall Greene
(74) *Attorney, Agent, or Firm* — Sughrue Mion, PLLC (57) ABSTRACT

A battery module disposed in a battery pack includes a plurality of flat plate batteries that are stacked; a connection member having a connection member main body that has a plate-shape and disposed in parallel with the flat plate batteries in a stacking direction of the flat plate batteries; and insulation members disposed on side surfaces of the connection member main body in the stacking direction of the flat plate batteries. The connection member has two terminals, a first terminal of the two terminals is connected to a terminal of the flat plate batteries, and a second terminal is connected to a terminal of an adjacent battery module.

7 Claims, 8 Drawing Sheets

(56) References Cited

U.S. PATENT DOCUMENTS

| | | | | |
|---|---|---|---|---|
| 2013/0196210 A1* | 8/2013 | Kim | ............... | H01M 10/0436 |
| | | | | 429/153 |
| 2013/0260215 A1* | 10/2013 | Kim | ............... | H01M 2/0202 |
| | | | | 429/163 |
| 2013/0273412 A1 | 10/2013 | Okada et al. | | |
| 2014/0017538 A1 | 1/2014 | Nkamori et al. | | |
| 2015/0380716 A1* | 12/2015 | Zama | ............... | H01M 2/26 |
| | | | | 429/211 |
| 2019/0372184 A1* | 12/2019 | Yeow | ............... | H01M 10/6555 |

FOREIGN PATENT DOCUMENTS

| | | | |
|---|---|---|---|
| JP | 2003-242951 | A | 8/2003 |
| JP | 2005-5163 | A | 1/2005 |
| JP | 2005-340016 | A | 12/2005 |
| JP | 2010-198930 | A | 9/2010 |
| JP | 2010-287516 | A | 12/2010 |
| JP | 2011-159474 | A | 8/2011 |
| JP | 2013-077500 | A | 4/2013 |
| JP | 2014-022098 | A | 2/2014 |
| JP | 2016-46018 | A | 4/2016 |
| JP | 2016-100045 | A | 5/2016 |
| KR | 10-2012-0006973 | A | 1/2012 |
| WO | 2012/057323 | A1 | 5/2012 |

\* cited by examiner

BATTERY MODULE AND BATTERY PACK

INCORPORATION BY REFERENCE

The disclosure of Japanese Patent Application No. 2017-218357 filed on Nov. 13, 2017 including the specification, drawings and abstract is incorporated herein by reference in its entirety.

BACKGROUND

1. Technical Field

The disclosure relates to a battery module and a battery pack.

2. Description of Related Art

There is a technology that electrically connects a plurality of flat plate batteries to each other to form a module for a battery module, and forms a battery pack by accommodating a plurality of battery modules in a case (for example, Japanese Unexamined Patent Publication No. 2013-077500 (JP 2013-077500 A), Japanese Unexamined Patent Application Publication No. 2010-287516 (JP 2010-287516 A), WO 2012/057323). For such a battery pack, connecting the battery modules to each other by a busbar provided outside the battery module has been studied (for example, JP 2013-077500 A).

SUMMARY

In a battery pack described in JP 2013-077500 A, terminals of adjacent battery modules are connected to each other by a busbar extending above the battery module. In a case where such a battery pack is used for driving a motor of an automobile, for example, since a large amount of current flows with rapid charging or the like through the busbar, the busbar needs to be sufficiently thick. A thick busbar installed on the outside of the battery module for this reason causes the volume energy density of the battery pack to be decreased.

The disclosure provides a battery module and a battery pack that further suppress a decrease in a volume energy density caused by providing a connection member between the battery modules on the outside of the battery module.

A first aspect of the disclosure relates to a battery module disposed in a battery pack. The battery module includes: a plurality of flat plate batteries that are stacked; a connection member having a connection member main body that has a plate-shape and disposed in parallel with the flat plate batteries in a stacking direction of the flat plate batteries; and insulation members disposed on side surfaces of the connection member main body in the stacking direction of the flat plate batteries. The connection member has two terminals. A first terminal of the two terminals is connected to a terminal of the flat plate batteries. A second terminal of the two terminals is connected to a terminal of an adjacent battery module.

In the battery module according to the first aspect of the disclosure, the two terminals of the connection member may be provided on two opposite sides on which the insulation members of the connection member main body are not provided.

In the battery module according to the first aspect of the disclosure, the flat plate batteries may each be configured to have a positive electrode terminal and a negative electrode terminal on the same side surface, and the first terminal of the connection member may be disposed on the same side as a side surface side on which the terminals of the flat plate batteries are provided, with respect to the battery module.

In the battery module according to the first aspect of the disclosure, the connection member may be a flat plate battery.

In the battery module according to the first aspect of the disclosure, the connection member may be formed of a conductive material.

In the battery module according to the first aspect of the disclosure, the connection member main body may be formed in a flat plate shape.

The battery module according to the first aspect of the disclosure may further include outer fixing members disposed on both sides of a stack formed of the flat plate batteries in the stacking direction of the flat plate batteries and fixed to a case of the battery pack. The connection member may be disposed between the outer fixing members.

In the battery module according to the first aspect of the disclosure, the connection member may be disposed between the outer fixing members such that at least one of the flat plate batteries is disposed between the connection member and each of the outer fixing members.

In the battery module according to the first aspect of the disclosure, the flat plate batteries may be all-solid-state batteries. The outer fixing members may be configured to apply a load to the flat plate batteries in the stacking direction of the flat plate batteries. The connection member main body may be formed in a flat plate shape, and the connection member main body may be configured to cover an entire load-bearing portion of the flat plate batteries to which the load is applied from the outer fixing members as viewed in the stacking direction of the flat plate batteries.

A second aspect of the disclosure relates to a battery pack. The battery pack includes a plurality of the battery modules according to the first aspect of the disclosure. Battery modules adjacent to each other are disposed such that a terminal of the connection member of one of the adjacent battery modules faces one of the terminals of the flat plate batteries of another battery module and the terminals are connected to each other.

With the aspect of the disclosure, a decrease in the volume energy density, which is caused by providing the connection member between the battery modules on the outside of the battery module, can further be suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described in detail with reference to the drawings. In the following description, the same reference numerals are attached to similar components.

First Embodiment

Components of Battery Pack

Figure 1:
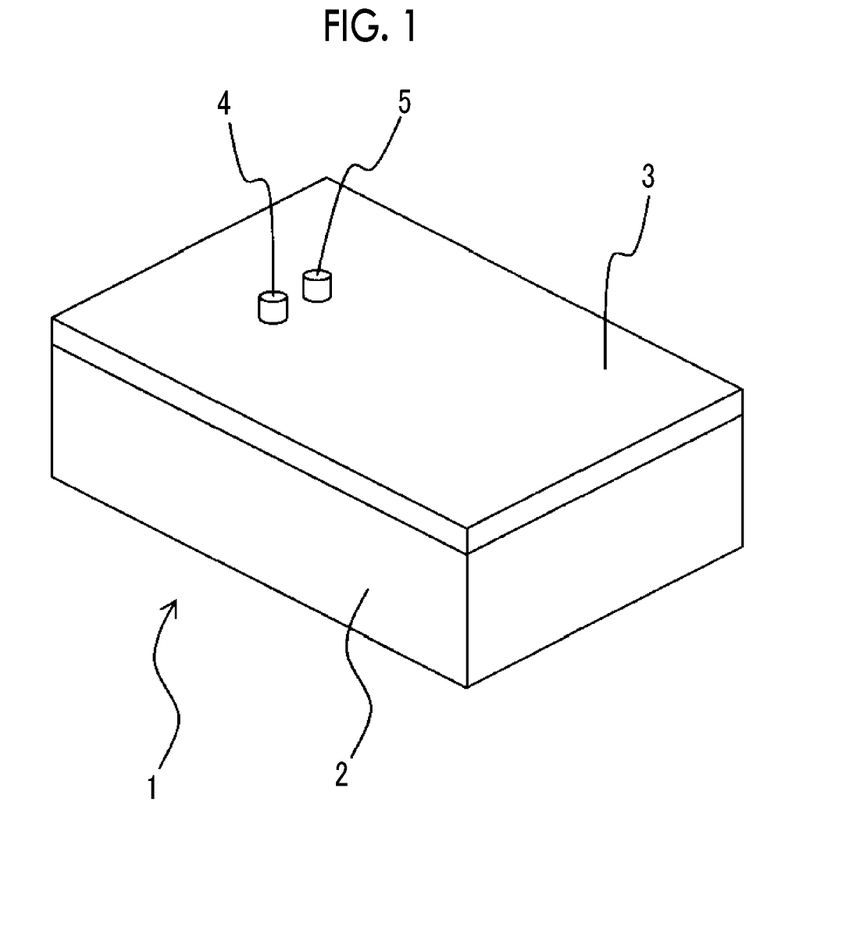
FIG. 1 is a perspective view schematically showing a battery pack case.

FIG. 1 is a perspective view schematically showing a battery pack 1. The battery pack 1 is disposed below a floor panel of a vehicle cabin in, for example, an electric vehicle (EV) or a hybrid vehicle (HV). The battery pack 1 includes a battery pack case 2 that accommodates a battery module 10 and an electronic device 9, which will be described below, and a battery pack cover 3 that closes an opening of the battery pack case 2. Two openings are formed on the battery pack cover 3, and battery terminals 4, 5 for charging and discharging a secondary battery in the battery pack 1 extend to the outside of the battery pack 1 through the two openings. The battery terminals 4, 5 extend from the inside to the outside of the battery pack 1 passing through the battery pack cover 3 in the illustrated first embodiment, although the battery terminals 4, 5 may also extend from the inside to the outside of the battery pack 1 through the battery pack case 2. The battery terminals 4, 5 may be also directly attached to the battery pack case 2 or the battery pack cover 3.

Figure 2:
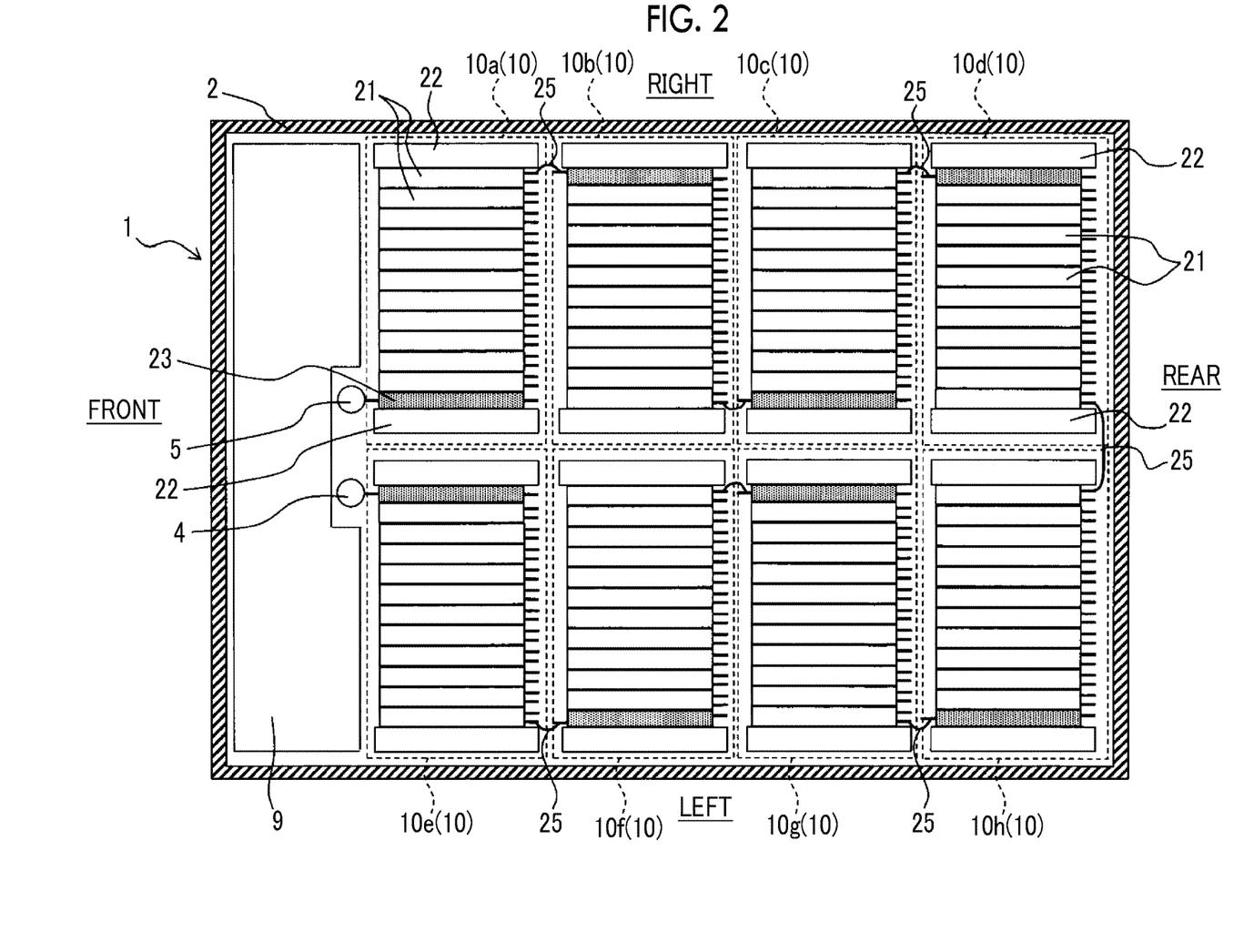
FIG. 2 is a plan view schematically showing the battery pack.

FIG. 2 is a plan view schematically showing the battery pack 1 with the battery pack cover 3 removed. In the specification, for the sake of convenience, description will be provided referring to the left side of FIG. 1 as front, the right side as rear, the upper side as right, and the lower side as left. The description, however, does not define a direction in which the battery pack 1 is installed to the vehicle, and the battery pack 1 may be disposed in any orientation with respect to the vehicle.

As shown in FIG. 2, in the battery pack case 2, the electronic device 9 and a plurality of battery modules 10 are disposed. In an example shown in FIG. 2, the electronic device 9 is disposed in a region in the front of the battery pack case 2, and all the battery modules 10 are disposed behind the electronic device 9. The electronic device 9 may be provided at any position such as between the battery modules 10.

The electronic device 9 includes a device that detects the state of the battery module 10 or flat plate batteries 21 constituting the battery module 10 in the battery pack 1, or that controls the battery module 10 or the flat plate batteries 21 constituting the battery module 10 in the battery pack 1. Thus, the electronic device 9 is connected to each of the battery modules 10 by, for example, a wire harness and detects the voltage between two terminals between the battery modules 10 or the like.

Configuration of Battery Module

As shown in FIG. 2, the battery module 10 includes a plurality of flat plate batteries 21 that are stacked, outer fixing members 22 disposed on both sides of a stack formed of the flat plate batteries 21 in a stacking direction of the flat plate batteries 21, and a plate-shaped connection member 23 and disposed in parallel with the flat plate batteries in the stacking direction of the flat plate batteries 21.

Figure 3:
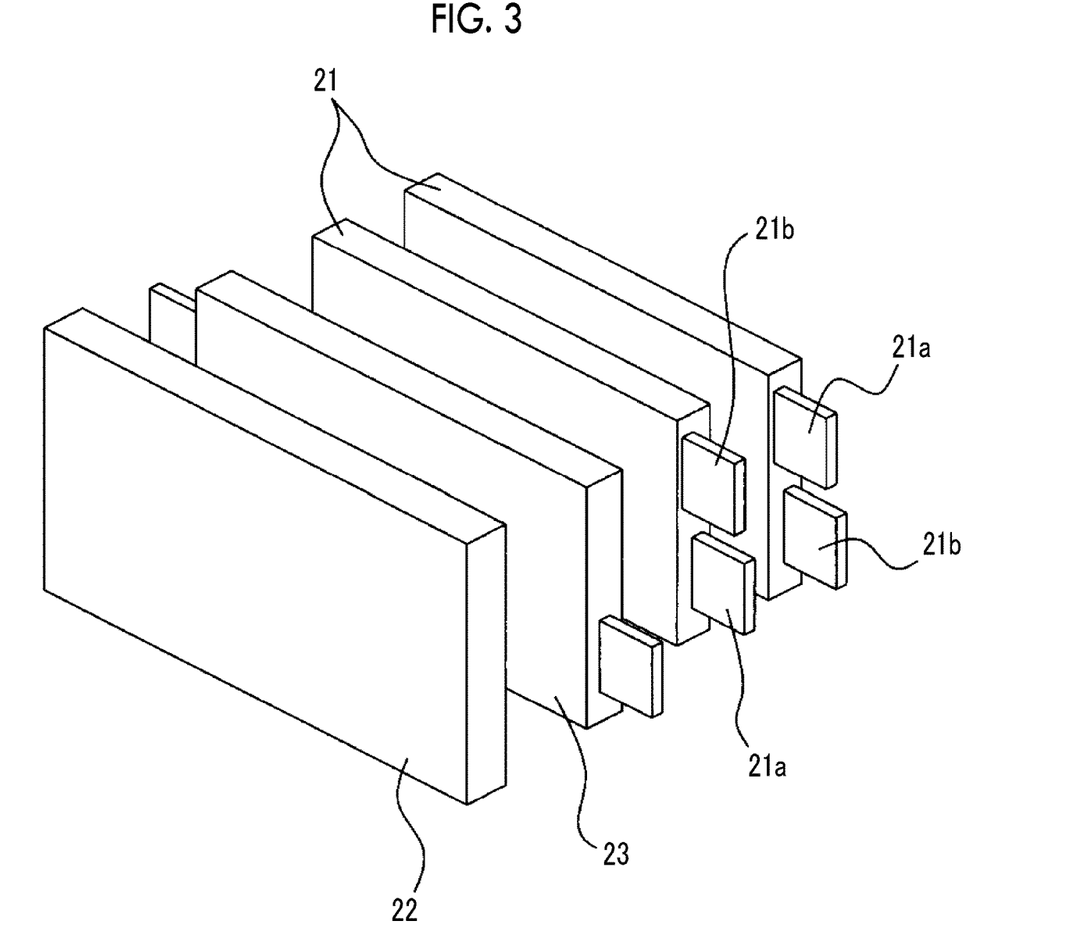
FIG. 3 is an exploded perspective view schematically showing a part of a battery module.

FIG. 3 is an exploded perspective view schematically showing a part of the battery module. In FIG. 3, the flat plate batteries 21, the outer fixing member 22, and the connection member 23 are shown apart from each other; but surfaces of the flat plate batteries 21 and the connection member 23 are actually in contact with each other via an insulation member 35 which will be described below, and surfaces of the connection member 23 and the outer fixing member 22 are in contact with each other via the insulation member 35.

Each of the flat plate batteries 21 has a positive electrode terminal 21a and a negative electrode terminal 21b. In the first embodiment, each of the flat plate batteries 21 is configured to have the positive electrode terminal 21a and the negative electrode terminal 21b on the same side surface. In particular, in the first embodiment, as shown in FIG. 2, each of the flat plate batteries 21 is configured to have both of the positive electrode terminal 21a and the negative electrode terminal 21b disposed on a rear side surface of a main body of each of the flat plate batteries 21. Each of the flat plate batteries 21, however, may be disposed on a side surface facing any direction in the battery pack case 2 insofar as the positive electrode terminal 21a and the negative electrode terminal 21b are disposed on the same side surface.

The positive electrode terminal 21a and the negative electrode terminal 21b are, although not particularly limited, preferably disposed in a horizontal direction from the main body of the flat plate battery 21 rather than in a vertical direction. As such, disposing the positive electrode terminal 21a and the negative electrode terminal 21b of each of the flat plate batteries 21 not to extend in the vertical direction eliminates the need to provide a space for the terminal in the vertical direction in the battery pack 1, thereby allowing the overall height of the battery pack 1 to be kept low.

Figure 4:
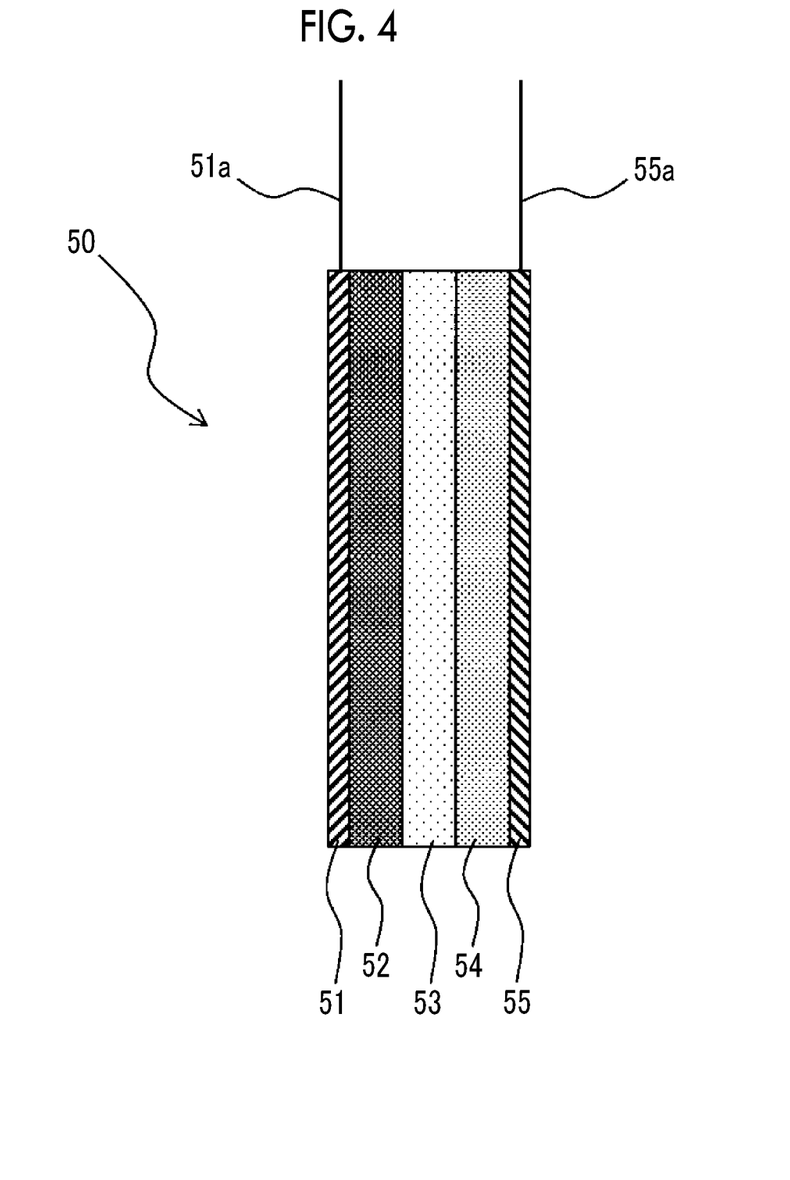
FIG. 4 is a schematic sectional view of a battery element.

Each of the flat plate batteries 21 includes one or a plurality of battery elements 50. FIG. 4 is a schematic sectional view of a battery element 50. As shown in FIG. 4, in the battery element 50, a positive electrode current collector layer 51, a positive electrode active material layer 52, a solid electrolyte layer 53, a negative electrode active material layer 54, and a negative electrode current collector layer 55 are stacked in this order. In the first embodiment, the positive electrode current collector layer 51, the positive electrode active material layer 52, the solid electrolyte layer 53, the negative electrode active material layer 54, and the negative electrode current collector layer 55 are respectively formed of a solid material.

The positive electrode current collector layer 51 has a positive electrode current collector and has a function of collecting current from the positive electrode active material layer 52. Examples of materials to be used for the positive electrode current collector include aluminum, stainless steel, nickel, iron, and titanium. The positive electrode current collector layer 51 has a positive electrode 51a protruding from the battery element 50 and functioning as a positive electrode of the battery element 50.

The positive electrode active material layer 52 contains a positive electrode active material. In a case where the battery element 50 is a lithium ion battery, examples of the positive electrode active material to be used as appropriate include known positive electrode active materials, such as lithium cobalt oxide or lithium manganese oxide. The positive electrode active material layer 52 may further contain a solid electrolyte, a conductive agent, and a binder in addition to the positive electrode active material.

Examples of the solid electrolyte to be used for the positive electrode active material layer 52 include the same material as the material used for the solid electrolyte layer 53, which will be described below, an oxide-based amorphous solid electrolyte, and a crystalline oxide.

The solid electrolyte layer 53 includes a solid electrolyte, which is a solid substance exhibiting ionic conductivity. In a case where the battery element 50 is a lithium ion battery, known solid electrolytes such as sulfide solid electrolytes, such as $Li_2S$—$P_2S_5$ and $Li_7P_3S_{11}$, and oxide solid electrolytes, such as LiI and $Li_2O$—$B_2O_3$—$P_2O_5$, may be used as the solid electrolyte, as appropriate.

The negative electrode active material layer 54 contains a negative electrode active material. In a case where the battery element 50 is a lithium ion battery, as the negative electrode active material, known negative electrode active materials such as graphite may be used, as appropriate. The negative electrode active material layer 54 may also further contain a solid electrolyte, a conductive agent, and a binder as described above in addition to the negative electrode active material.

The negative electrode current collector layer 55 has a negative electrode current collector and has a function of collecting current from the negative electrode active material layer 54. Examples of materials to be used for the negative electrode current collector include copper in addition to the materials for the positive electrode current collector. The negative electrode current collector layer 55 has a negative electrode 55a protruding from the battery element 50 and functioning as a negative electrode of the battery element 50.

In the first embodiment, the battery element 50 is configured to have a solid electrolyte layer 53. The battery element 50, however, may be a battery other than all-solid-state battery; for example, liquid electrolyte batteries in which a positive electrode current collector layer, a positive electrode active material layer, a separator, a negative electrode active material layer, and a negative electrode current collector layer are impregnated in an electrolytic solution.

Each of the flat plate batteries 21 may be formed of a single battery element 50. In this case, the positive electrode 51a of the battery element 50 functions as the positive electrode terminal 21a of the flat plate battery 21, and the negative electrode 55a functions as the negative electrode terminal 21b of the flat plate battery 21.

Each of the flat plate batteries 21 may be a battery including an exterior body and one or more of the battery elements 50 accommodated in the exterior body. The exterior body may be formed of a laminate exterior body having a metal layer and a sealant material layer, and in this case, each of the flat plate batteries 21 is formed as a laminate battery. The exterior body may be a box-shaped member formed in a box shape, and in this case, each of the flat plate batteries 21 is formed as a rectangular battery.

In a case where each of the flat plate batteries 21 includes a single battery element 50 in the exterior body, the positive electrode 51a of the battery element 50 is connected to the positive electrode terminal 21a of the flat plate battery 21, and the negative electrode 55a is connected to the negative electrode terminal 21b of the flat plate battery 21. In a case where each of the flat plate batteries 21 includes the battery elements 50 in the exterior body, the battery elements 50 are connected to each other in series or in parallel. The positive electrodes 51a of at least some of the battery elements 50 are connected to the positive electrode terminal 21a of the flat plate battery 21. The negative electrodes 55a of at least some of the battery elements 50 are connected to the negative electrode terminal 21b of the flat plate battery 21.

As described above, each of the battery modules 10 includes the flat plate batteries 21 that are stacked. As can be seen from FIG. 2, the flat plate batteries 21 are stacked in the horizontal direction such that wide side surfaces of the flat plate batteries 21 face each other. In the first embodiment, in each of the battery modules 10, the positive electrode terminals 21a and the negative electrode terminals 21b of all the flat plate batteries 21 constituting the battery module 10 are disposed on the same side surface of the battery module 10.

The flat plate batteries 21 constituting each of the battery modules 10 are connected to each other in series or in parallel (not shown). In a case where adjacent flat plate batteries 21 are connected to each other in series, the positive electrode terminals 21a and the negative electrode terminals 21b of the adjacent flat plate batteries 21 are connected to each other. In a case where the adjacent flat plate batteries 21 are connected to each other in parallel, the positive electrode terminals 21a of the adjacent flat plate batteries 21 are connected to each other, and the negative electrode terminals 21b of the adjacent flat plate batteries 21 are connected to each other.

As described above, the outer fixing members 22 are disposed on both sides of the stack formed of the flat plate batteries 21 in the stacking direction of the flat plate batteries 21. Therefore, in the first embodiment, one outer fixing member 22 is disposed on the right side of the stack of the flat plate batteries 21 constituting the battery module 10, and one outer fixing member 22 is disposed on the left side. At least one of the two outer fixing members 22 constituting the battery module 10 is fixed to the battery pack case 2 by a bolt or the like.

In the first embodiment, the outer fixing members 22 included in each of the battery modules 10 are linked to each other by, for example, a shaft (not shown) extending between both of the outer fixing members 22. In particular, in the first embodiment, the outer fixing members 22 are linked to each other to apply a large load to the flat plate batteries 21 in the stacking direction of the flat plate batteries 21 disposed between the outer fixing members 22. This configuration enables to apply a restraining force in the stacking direction of the battery elements 50 of the flat plate batteries 21, which are all-solid-state battery.

Configuration of Connection Member

Figure 5:
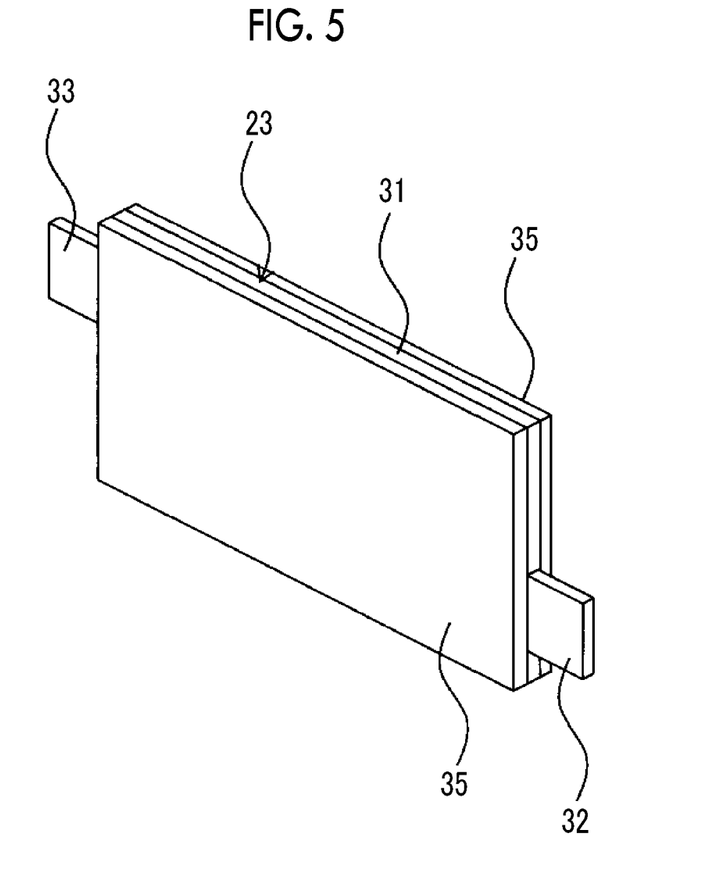
FIG. 5 is a perspective view schematically showing a connection member.

FIG. 5 is a perspective view schematically showing the connection member 23. As shown in FIG. 5, the connection member 23 includes a connection member main body 31 in a flat plate shape and two connection terminals 32, 33 provided on opposite side surfaces of the connection member main body 31. In the first embodiment, the connection member 23 is obtained by integrally forming the connection member main body 31, and both of the connection terminals 32, 33 with a conductive material such as metal.

As shown in FIG. 5, insulation members 35 are provided on wide side surfaces of the connection member main body 31 on which the connection terminals 32, 33 are not provided. In other words, the connection terminals 32, 33 are provided on the opposite side surfaces of the connection member main body 31 on which the insulation members 35 are not provided. The insulation members 35 may be made of any material exhibiting insulating properties, such as a resin; for example, the insulation members 35 may be formed of a resin laminate provided on the side surfaces of the connection member main body 31.

As shown in FIG. 5, in the first embodiment, the insulation members 35 are disposed over the entire wide side surfaces of the connection member main body 31. The insulation members 35, however, do not necessarily cover the entire wide side surfaces of the connection member main body 31, and may be disposed to cover a part of the connection member main body 31. In this case, the insulation members 35 are disposed on the side surfaces of the connection member main body 31 such that the flat plate battery 21 disposed adjacent to the connection member main body 31 and the connection member 23 are not brought into direct contact with each other, and such that the outer fixing member 22 disposed adjacent to the connection member main body 31 and the connection member 23 are not brought into direct contact with each other.

As shown in FIG. 2 and FIG. 3, the connection member 23 is disposed in parallel with the flat plate battery 21. Therefore, the wide side surface of the connection member 23 is disposed to face the side surface of the flat plate battery 21. The connection member 23 is disposed between the flat plate batteries 21 and one of the outer fixing members 22.

Figure 6:
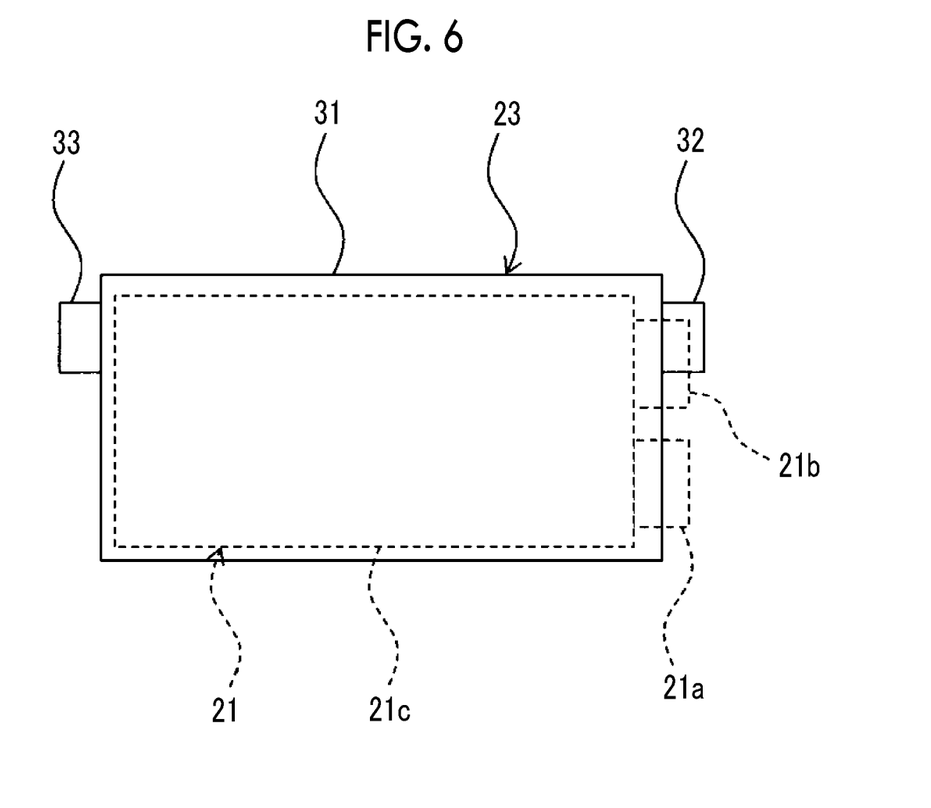
FIG. 6 is a side view schematically showing the connection member.

FIG. 6 is a side view schematically showing the connection member 23 in the stacking direction of the flat plate batteries 21. In the drawing, the flat plate battery 21 disposed adjacent to the connection member 23 is indicated with broken lines. As can be seen from FIG. 6, when viewed in the stacking direction of the flat plate batteries 21, the connection member main body 31 formed in a flat plate shape is disposed to cover the entire flat plate battery 21 excluding the positive electrode terminal 21a and the negative electrode terminal 21b (hereinafter referred to as "flat plate battery main body 21c").

As described above, a load is applied to the flat plate battery main body 21c by the outer fixing members 22 in the stacking direction of the flat plate batteries 21. In this case, from the outer fixing member 22, the load is applied to the flat plate battery main body 21c. Therefore, the flat plate battery main body 21c is considered to be the load-bearing portion that bears the load from the outer fixing member 22 in the flat plate battery 21. As described above, the connection member main body 31 is configured to cover the entire flat plate battery main body 21c in the stacking direction of the flat plate batteries 21. Therefore, the connection member main body 31 is considered to be configured to cover the entire load-bearing portion of the flat plate battery 21 to which the load is applied from the outer fixing member 22 in the stacking direction of the flat plate batteries 21.

For example, in a case where the flat plate battery 21 is configured as the laminate battery, the flat plate battery main body 21c includes the exterior body and the battery element accommodated in the exterior body. In this case, the battery element may not be disposed on a part of an outer peripheral region of the flat plate battery main body 21c when viewed in the stacking direction of the flat plate batteries 21 (on the part of the outer peripheral side, battery element does not exist between the exterior bodies in order to attach the exterior bodies together by lamination processing). In the case as described above, a load is applied from the outer fixing members 22 to a region of the flat plate battery 21 where the battery element occupies. Thus, the region of the flat plate battery 21 where the battery element occupies is considered to be the load-bearing portion. In this case, the connection member main body 31 is configured to cover the load-bearing portion of the flat plate battery 21, that is, the entire portion where the battery element occupies when viewed in the stacking direction of the flat plate batteries 21.

Having the connection member 23 to have a configuration as described above allows the restraining force to be applied to the flat plate battery 21 which is an all-solid-state battery in an appropriate manner when the connection member 23 is disposed between the flat plate battery 21 and the outer fixing member 22.

Configuration of Battery Pack

Referring back to FIG. 2, the disposition and the configuration of the battery module 10 or the like in the battery pack 1 will be described. As described above, the battery modules 10 are accommodated in the battery pack case 2. In the example shown in FIG. 2, eight battery modules 10 from a first battery module 10a to an eighth battery module 10h are accommodated in the battery pack case 2.

The battery modules 10 accommodated in the battery pack case 2 are disposed such that the stacking directions of the flat plate batteries 21 constituting each of the battery modules 10 are the same. In the example shown in FIG. 2, in the battery pack case 2, each of the battery modules 10 is disposed such that the flat plate batteries 21 are stacked in a right-to-left direction. In particular, in the illustrated first embodiment, the positive electrode terminal 21a and the negative electrode terminal 21b of the flat plate batteries 21 constituting each of the battery modules 10 are disposed on a rear side of each of the battery modules 10.

In the connection member 23 included in each of the battery modules 10, a first connection terminal 32 of the connection member 23 is disposed on the rear side of each of the battery modules 10 and a second connection terminal 33 of the connection member 23 is disposed on the front side of each of the battery modules 10. As a result, the first connection terminal 32 of the connection member 23 is disposed on the same side as the side surface side on which the terminals 21a, 21b of the flat plate batteries 21 are provided, with respect to the battery module 10. The second connection terminal 33 of the connection member 23 is disposed on the side opposite the terminals 21a, 21b of the flat plate batteries 21, with respect to the battery module 10. As a result, a terminal of the connection member of one of adjacent battery modules 10 faces one of the terminals of the flat plate batteries of the other battery module 10 (or a terminal of the connection member of the other battery module 10).

The first connection terminal 32 of the connection member 23 of each of the battery modules 10 (that is, the connection terminal disposed on the same side as the terminals 21a, 21b of the flat plate battery 21) is connected to one of the positive electrode terminals 21a or one of the negative electrode terminal 21b of the flat plate batteries 21 (not shown). The second connection terminal of the connection member 23 of each of the battery modules 10 (that is, the connection terminal disposed on the side opposite the terminals 21a, 21b of the flat plate battery 21) is connected to a terminal of an adjacent battery module 10 (one of the connection terminals 32, 33 of the connection member 23 included in the battery module 10, and the terminals 21a, 21b of the flat plate batteries 21) by a linking member 25 exhibiting conductivity. In the first embodiment, the first connection terminal 32 among the connection terminals 32, 33 of the connection member 23 is connected to one of the terminals 21a, 21b of the flat plate batteries 21 of the battery module 10. The second connection terminal 33 among the connection terminals 32, 33 of the connection member 23 is connected to the terminals of the adjacent battery module 10.

For example, in the example shown in FIG. 2, the first connection terminal of the connection member 23 of a second battery module 10b is connected to one of the terminals 21a, 21b of the flat plate batteries 21 of the second battery module 10b. The second connection terminal of the connection member 23 of the second battery module 10b is connected to one of the terminals 21a, 21b of the flat plate batteries 21 of the first battery module 10a. Similarly, the first connection terminal of the connection member 23 of a third battery module 10c is connected to one of the terminals 21a, 21b of a flat plate batteries 21 of the third battery module 10c, and the second connection terminal of the connection member 23 of the third battery module 10c is connected to one of the terminals 21a, 21b of the flat plate batteries 21 of the second battery module 10b.

In the example shown in FIG. 2, the second connection terminal of the connection member 23 of the first battery module 10a is connected to a battery terminal 5 with a linking member having conductivity. The second connection terminal of the connection member 23 of a fifth battery module 10e is connected to a battery terminal 4 with a linking member having conductivity.

As described above, the first embodiment employs the plate-shaped connection member 23 provided in each of the battery modules 10 to connect the terminals of adjacent battery modules 10 to each other. This configuration eliminates the need to provide a busbar, a wire or the like extending across the battery module 10 outside the battery module 10. In a case where a busbar or a wire is provided outside the battery module 10, it is needed to thicken the busbar or the wire, through which a large current flows, and thus a sufficient space for accommodating the busbar or the wire needs to be secured outside the battery module for the purpose of preventing occurrence of a short circuit, which is caused by wear in the busbar or the wire due to a vehicle vibration, or the like. In contrast, the configuration according to the first embodiment eliminates the need to provide the large space outside the battery module 10, thereby increasing the volume energy density of the battery pack 1.

In a case where the busbar or the wire is provided outside the battery module 10, for example, the busbar or the wire may come in contact with a portion which is not supposed to be contacted when the battery pack 1 is deformed due to a vehicle collision or the like, and may result in the short circuit or the like. In contrast, according to the first embodiment, the connection member 23 is disposed between the outer fixing members 22 fixed to the battery pack case 2. This configuration renders the short circuit or the like less likely to occur under deformation of the battery pack 1. Therefore, the safety of the battery pack 1 can further be enhanced.

Modified Examples

In the first embodiment, the connection member main body 31 of the connection member 23 is formed in a flat plate shape. The connection member 23, however, is not necessarily formed in the flat plate shape, as long as the connection member 23 is formed in the plate shape. Therefore, for example, the connection member 23 may be formed in a corrugated plate shape. In this case, a passageway for fluid is formed between the connection member 23 and the flat plate batteries 21 disposed adjacent to the connection member 23. This allows the flat plate battery 21 to be cooled easily.

In the first embodiment, the connection member 23 is formed of a conductive material such as a metal. The connection member 23, however, does not necessarily be formed of conductive material entirely; the connection member 23 may partially be formed of conductive material, and the both of the connection terminals 32, 33 may be configured to be connected to each other through the conductive material. The connection member 23 may be configured as a flat plate battery in which a positive electrode terminal and a negative electrode terminal are provided on opposite side surfaces.

In the first embodiment, each of the flat plate batteries 21 is configured to have the positive electrode terminal 21a and the negative electrode terminal 21b on the same side surface. The flat plate batteries 21 each, however, may be configured to have the positive electrode terminal 21a and the negative electrode terminal 21b on different side surfaces, for example, on the opposite side surfaces.

In the first embodiment, the insulation member 35 is provided on the side surface of the connection member 23. The insulation member 35, however, is not necessarily provided between the connection member 23 and the outer fixing member 22 or between the connection member 23 and the flat plate battery 21 as long as the members provided on the side surfaces of the connection member 23 exhibit insulating properties. As specific aspects, for example, forming the outer fixing member 22 using an insulating material or forming the exterior bodies of the flat plate batteries 21 including an exterior body using an insulation material may be considered.

Figure 7:
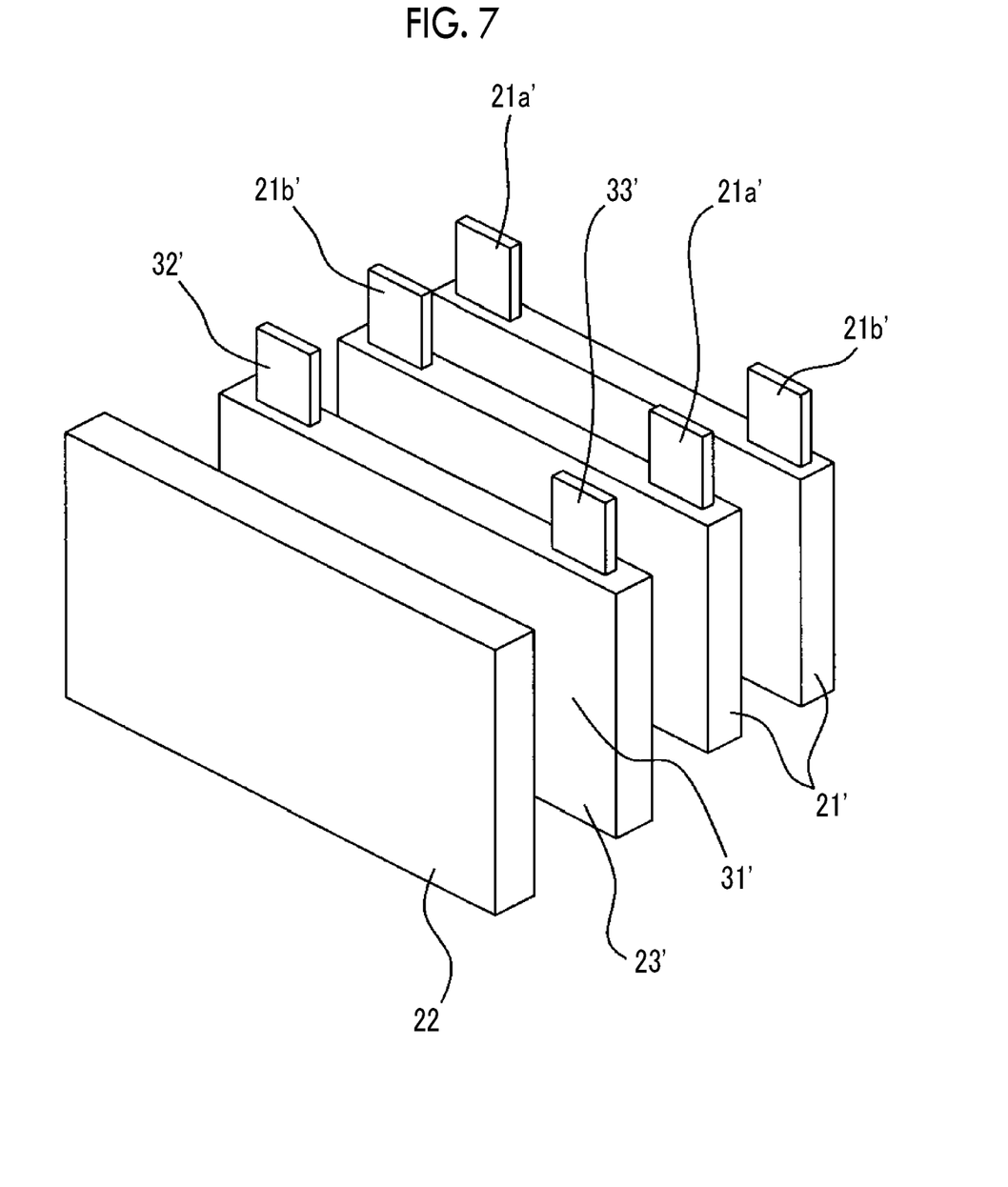
FIG. 7 is an exploded perspective view schematically showing a part of a battery module according to a modification example of a first embodiment.

In the first embodiment, both of the terminals 21a, 21b of the flat plate battery 21 are disposed on the rear side surface of the main body. Both of the two terminals 21a', 21b' of the flat plate battery 21', however, may be disposed in an upper side surface of the main body of the flat plate battery 21' as shown in FIG. 7. In this case, both of the terminals 21a', 21b' are disposed apart from each other on the upper side surface of the main body of the flat plate battery 21'.

In this case, the connection terminals 32', 33' of the connection member 23' are provided on the same side of the connection member main body 31'. In particular, as shown in FIG. 7, the connection terminals 32', 33' are disposed apart from each other on the upper surface of the connection member main body 31' in alignment with both of the terminals 21a', 21b' of the flat plate battery 21'. Having the connection member 23' to have a configuration as described above and thus to be disposed as such eliminates the need provide a busbar or a wire outside the battery module 10, and allows the battery pack 1 to have further increased the volume energy density.

Second Embodiment

Figure 8:
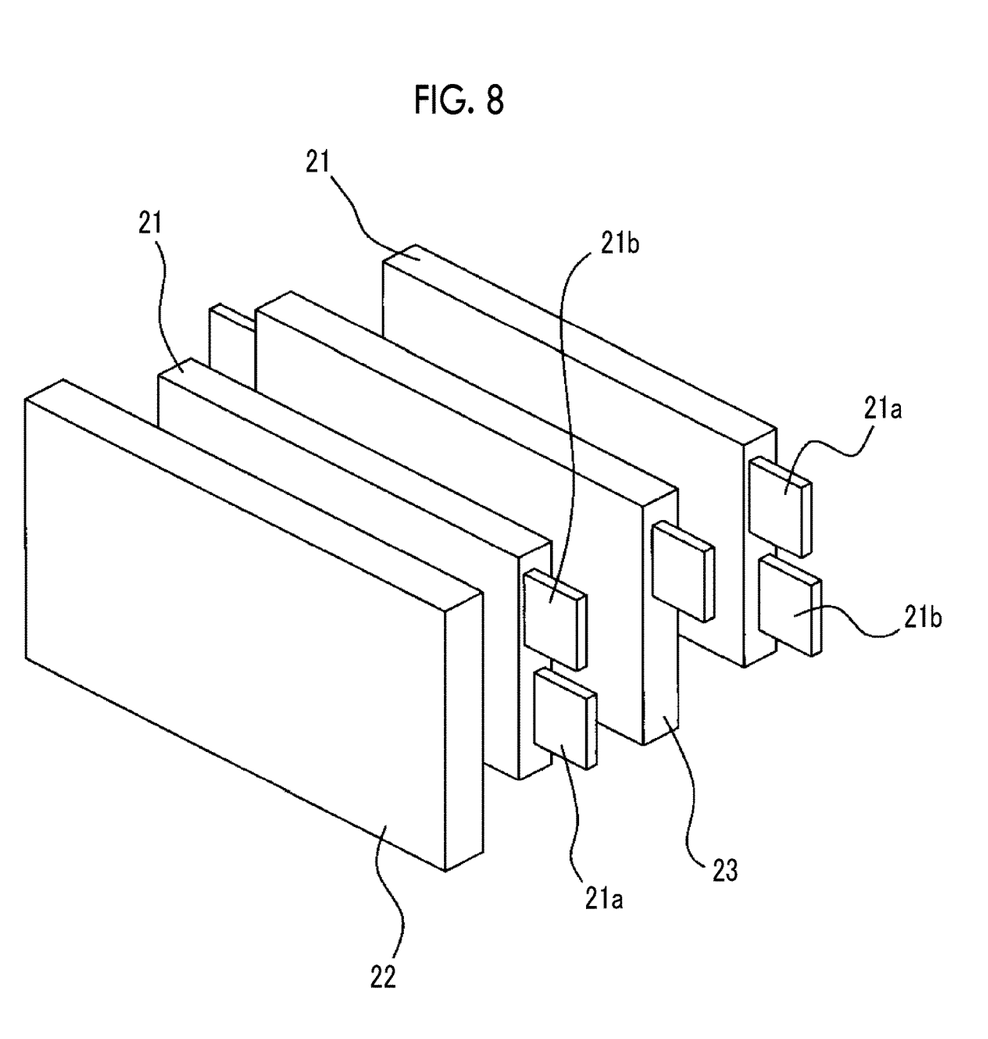
FIG. 8 is an exploded perspective view schematically showing a part of a battery module according to a second embodiment.

With reference to FIG. 8, a battery pack according to a second embodiment of the disclosure will be described. Since the configuration of the battery pack according to the second embodiment is basically the same as the configuration of the battery pack according to the first embodiment, the following description is provided focusing on differences from the configuration of the battery pack according to the first embodiment.

FIG. 8 is an exploded perspective view similar to FIG. 3, schematically showing a part of the battery module according to the second embodiment. In FIG. 8, the flat plate battery 21, the outer fixing member 22 and the connection member 23 are shown as being apart from each other. Surfaces of the flat plate battery 21 and the connection member 23, however, are in contact with each other.

As can be seen from FIG. 8, also in the second embodiment, the connection member 23 is disposed in parallel with the flat plate battery 21. In the second embodiment, the connection member 23 is disposed between the two flat plate batteries 21, instead of between the flat plate battery 21 and the outer fixing member 22, in the stacking direction of the flat plate batteries 21. In other words, in the second embodiment, the connection member 23 is disposed between the two outer fixing members 22 such that at least one flat plate battery is disposed between the connection member 23 and each of the outer fixing members 22. Therefore, in the second embodiment, as shown in FIG. 8, both side surfaces of the connection member 23 each are disposed to face a side surface of the flat plate batteries 21.

When the battery pack 1 is deformed due to the vehicle collision or the like, the insulation members 35 disposed on the surfaces of the connection member 23 may be broken causing the metallic outer fixing members 22 and the metallic connection member 23 to be in contact with each other. Such a contact between the outer fixing member 22 and the connection member 23 may further lead to electric leakage occurrence as described above.

In contrast, according to the second embodiment, one or more of the flat plate batteries 21 are disposed between each of the outer fixing members 22 and the connection member 23. Since the flat plate batteries 21 include the electrolyte layer exhibiting insulating properties, even when the metallic outer fixing members 22 and the battery element of the flat plate battery 21 come in contact with each other, a large current flow is further suppressed. This configuration according to the second embodiment renders of the electric leakage less likely to occur under deformation of the battery pack 1 due to the vehicle collision or the like.

What is claimed is:

1. A battery pack including a plurality of battery modules, each of the plurality of battery modules comprising:
   a plurality of flat plate batteries that are stacked;
   a connection member having a connection member main body that has a plate-shape and disposed in parallel with the flat plate batteries in a stacking direction of the flat plate batteries, wherein the connection member is located on an outermost side in the stacking direction of the flat plate batteries of each of the plurality of battery modules; and
   insulation members disposed on side surfaces of the connection member main body in the stacking direction of the flat plate batteries,
   wherein the connection member of each of the plurality of battery modules has a first connection terminal and a second connection terminal,
   wherein the plurality of battery modules includes a first battery module and a second battery module adjacent to the first battery module,
   wherein the first battery module and the second battery module are connected to each other in series,
   wherein, when the first connection terminal of the connection member of the first battery module is connected to a positive electrode terminal of the flat plate batteries in the first battery module, the second connection terminal of the connection member of the first battery module is connected to a negative electrode terminal of the flat plate batteries in the second battery module,
   wherein, when the first connection terminal of the connection member of the first battery module is connected to a negative electrode terminal of the flat plate batteries in the first battery module, the second connection terminal of the connection member of the first battery module is connected to a positive electrode terminal of the flat plate batteries in the second battery module,
   the first connection terminal and the second connection terminal of the connection member are provided on two opposite sides of the connection member, and the insulation members of the connection member main body are not provided on the two opposite sides, and
   in each of the battery modules, the first connection terminal of the connection member is disposed on a same side as a side surface on which the positive electrode terminal and the negative electrode terminal of the flat plate batteries are provided, and the second connection terminal of the connection member is disposed on an opposite side of the side surface on which the positive electrode terminal and the negative electrode terminal of the flat plate batteries are provided, and the positive electrode terminal and the negative electrode terminal of the flat plate batteries are disposed in a horizontal direction,
   wherein the second battery module is adjacent to the second connection terminal of the connection member of the first battery module in the direction in which the second connection terminal of the connection member of the first battery module extends,
   the second connection terminal of the connection member of the first battery module is connected to the positive electrode terminal or the negative electrode terminal of the flat plate batteries in the second battery module by a linking member, and
   the linking member is positioned between the first battery module and the second battery module.

2. The battery pack including the plurality of battery modules according to claim 1, wherein the connection member is a flat plate battery.

3. The battery pack including the plurality of battery modules according to claim 1, wherein the connection member is formed of a conductive material, and the connection member main body, the first connection terminal and the second connection terminal are integrally formed of the conductive material.

4. The battery pack including the plurality of battery modules, according to claim 1, wherein the connection member main body is formed in a flat plate shape.

5. The battery pack including the plurality of battery modules according to claim 1, wherein, in the first battery module, outer fixing members are disposed on both sides of a stack formed of the flat plate batteries in the stacking direction of the flat plate batteries and fixed to a case of the battery pack.

6. The battery pack including the plurality of battery modules according to claim 5, wherein the connection member is disposed between the outer fixing members such that at least one of the flat plate batteries is disposed between the connection member and one of the outer fixing members.

7. The battery pack including the plurality of battery modules according to claim 5, wherein:
   the flat plate batteries are all-solid-state batteries;
   the outer fixing members are configured to apply a load to the flat plate batteries in the stacking direction of the flat plate batteries; and
   the connection member main body is configured to cover an entire load-bearing portion of the flat plate batteries to which the load is applied from the outer fixing members as viewed in the stacking direction of the flat plate batteries.

* * * * *